United States Patent [19]

Van Driel et al.

[11] Patent Number: 5,613,210
[45] Date of Patent: Mar. 18, 1997

[54] TELECOMMUNICATION NETWORK FOR TRANSMITTING INFORMATION TO A PLURALITY OF STATIONS OVER A SINGLE CHANNEL

[75] Inventors: Carel-Jan L. Van Driel; Atul N. Sinha, both of Eindhoven, Netherlands

[73] Assignee: U.S. Philips Corporation, New York, N.Y.

[21] Appl. No.: 453,293

[22] Filed: May 30, 1995

Related U.S. Application Data

[63] Continuation of Ser. No. 151,077, Nov. 12, 1993, abandoned.

[30] Foreign Application Priority Data

Nov. 19, 1992 [EP] European Pat. Off. .............. 92203568

[51] Int. Cl.⁶ .............................. H04B 1/50; H04B 10/24
[52] U.S. Cl. .............................. 455/45; 370/343; 359/125
[58] Field of Search .................................. 455/33.1, 34.1, 455/45, 53.1, 54.1, 60, 61, 62, 63; 370/30, 69.1, 71; 359/125, 124

[56] References Cited

U.S. PATENT DOCUMENTS

| | | | |
|---|---|---|---|
| 4,789,980 | 12/1988 | Darcie et al. | 370/69.1 |
| 4,914,648 | 4/1990 | Acampora et al. | 359/125 |
| 5,301,053 | 4/1994 | Shikada | 359/125 |

OTHER PUBLICATIONS

"Optical Interference in Subcarrier Multiplexed Systems with Multiple Optical Carriers" C. Desem, IEEE Journal on Selected Areas in Communication, vol. 8, No. 7, Sep. 1990, pp. 1290–1295.

"Wide Band Lightwave Distribution System Using Subcarrier Multiplexing" T.E. Darcy et al, IEEE Journal of Lightwave Technology, vol. 7, No. 6, Jun. 1989, pp. 997–1005.

Primary Examiner—Reinhard J. Eisenzopf
Assistant Examiner—Thanh Le

[57] ABSTRACT

In a multiple access network a main station is to be capable of distinguishing signals transmitted by sub-stations to the main station. A method of realising this is the use of SCMA (SubCarder Multiple Access). According to this method the signal to be transmitted is modulated on a subcarrier having its own frequency and then modulated on a main carrier in each sub-station. In prior-art multiple access network the distribution signals which are to be transmitted to the sub-stations by the main station are modulated each on its own distribution subcarrier and then applied to a shared distribution modulator. For diminishing the requirements posed on the high-frequency properties of the electronic components necessary for the network, the subcarriers for distribution signals and return signals are selected to lie in the same frequency band.

6 Claims, 3 Drawing Sheets

TELECOMMUNICATION NETWORK FOR TRANSMITTING INFORMATION TO A PLURALITY OF STATIONS OVER A SINGLE CHANNEL

This is a continuation of application Ser. No. 08/151,077, filed Nov. 12, 1993, now abandoned.

BACKGROUND OF THE INVENTION

The invention relates to a telecommunication network comprising a main station coupled to a plurality of sub-stations over a channel, the main station comprising a distribution modulator for modulating on a distribution carrier a combination of a plurality of distribution signals modulated on distribution subcarriers, each sub-station comprising a return modulator for modulating on a return carrier a return signal modulated on its own return subcarrier.

The invention likewise relates to a main station and a sub-station to be used in a telecommunication network defined above.

A telecommunication network according to the opening paragraph is known from the journal article "Wide-Band Lightwave Distribution System Using Subcarrier Multiplexing" by T. E. Darcy et. al. in IEEE Journal of Lightwave Technology, Vol. 7, No. 6, June 1989, pp. 997–1005.

Such transmission systems are used for communication between a main station and a plurality of sub-stations over a channel used in common by the sub-stations. This channel may be formed, for example, by a glass fibre, a coaxial cable or a radio link. Applications of such transmission systems are, for example, passive optical networks, local area networks, satellite communication systems and mobile telephone systems.

In telecommunication networks utilizing a common channel for all the sub-stations it is to be ensured that no or only little mutual interference is caused by sub-stations simultaneously transmitting information to the main station.

Generally, this may be achieved by giving the signals to be transmitted by the sub-stations their own frequencies, so that at the main station, for example, by means of frequency selective filters, the signals coming from different sub-stations may be separated. Another option is making a different time slot in a frame available to each sub-station, so that only a single sub-station at a time transmits a signal to the main station.

SUMMARY OF THE INVENTION

A simple alternative to said methods is the telecommunication network known from said journal article in which sub-stations are used which generate a return carrier with a carrier frequency that may be about the same or different for the various sub-stations. This return carrier is modulated by a return signal modulated on a return subcarrier. The return carrier may, for example, be amplitude modulated (intensity) or frequency modulated.

The main station receives a combination of all the return carriers transmitted by the various sub-stations. After this combination of return carriers has been demodulated, a signal is available which is a combination of the modulated return carriers. Each of the modulated return carriers may be separated by means of filters and subsequently demodulated.

For transmitting distribution signals from the main station, a distribution carrier is modulated by a combination of distribution signals modulated on distribution subcarriers.

In prior-art telecommunication network certain components such as, for example, modulators and demodulators for the subcarriers having the highest frequencies are to use electronic circuits suitable for such high frequencies.

It is an object of the invention to provide a telecommunication network as defined in the opening paragraph, in which the requirements posed on the maximum signal frequency of said components may be reduced. For this purpose, the invention is characterized in that the frequency band of the distribution subcarriers and the frequency band of the return carriers at least partly overlap.

By placing the frequency of the distribution subcarriers and the return carriers in overlapping frequency bands, the frequency of the subcarrier having the highest frequency may be lower than in the state-of-the-art telecommunication network. As a result, less strict requirements may be posed on the high-frequency behaviour of the electronic circuits necessary in the telecommunication network.

An embodiment of the invention is characterized in that the frequency of the distribution subcarrier intended for a sub-station and the frequency of the return subcarrier coming from that sub-station are different.

By selecting the subcarrier frequencies to be assigned to the sub-stations in such a way that the frequency of the distribution subcarrier and that of the return subcarrier for a specific sub-station are different, there is avoided that a signal transmitted by a sub-station ends up in the receiver of the same sub-station due to network reflection and causes interference there.

BRIEF DESCRIPTION OF THE DRAWINGS

The invention will be further explained with reference to the drawing Figures in which.

DETAILED DESCRIPTION OF THE PREFERRED EMBODIMENTS

Figure 1A:
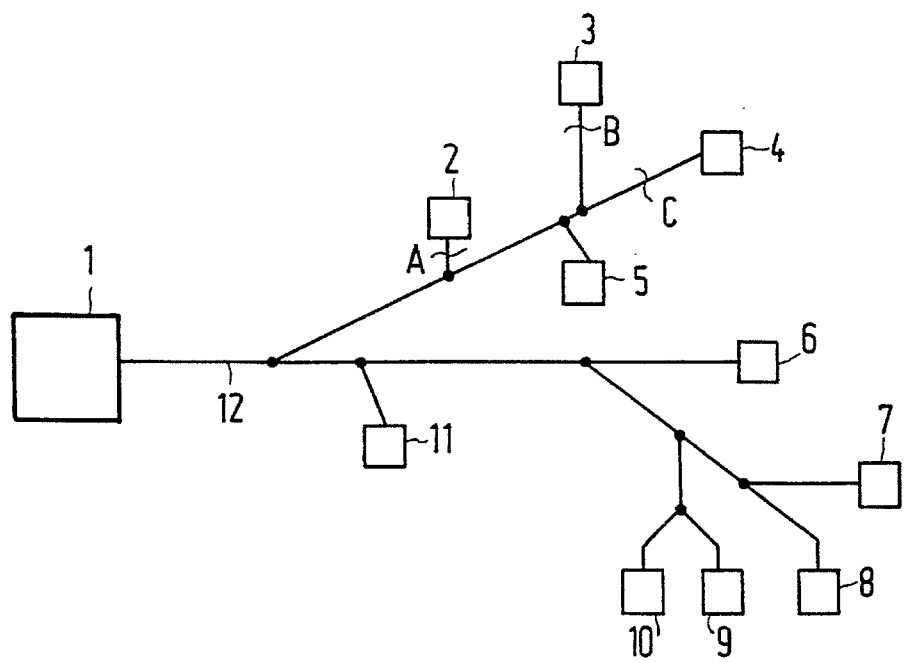
FIG. 1a shows a passive optical network in which the invention can be implemented.

The telecommunication network shown in FIG. 1a comprises a main station 1 connected to the sub-stations 2 to 11 over the channel in this case being a glass fibre network 12. At the junctions the light emitted by the main station is split up for further distribution through the network to the sub-stations 2 to 11. Light signals emitted by the sub-stations are combined in the junctions to a combined light signal to be applied to the main station.

To reduce the requirements posed on the maximum signal frequency of the components used in the main station and sub-stations, the frequencies of the distribution subcarriers are generated according to the inventive idea in the main station and the frequencies of the return subcarriers are generated in the sub-stations in an overlapping frequency area. The Table below shows a possible frequency subdivision of the distribution subcarrier and return subcarrier frequencies assigned to the sub-stations 2 to 11 of FIG. 1a.

| SUBSTATION | $f_{DISTRIBUTION}$ | $f_{RETURN}$ |
|---|---|---|
| 2 | $f_7$ | $f_2$ |
| 3 | $f_8$ | $f_3$ |
| 4 | $f_9$ | $f_4$ |
| 5 | $f_{10}$ | $f_5$ |
| 6 | $f_2$ | $f_7$ |
| 7 | $f_3$ | $f_8$ |
| 8 | $f_4$ | $f_9$ |
| 9 | $f_5$ | $f_{10}$ |
| 10 | $f_{11}$ | $f_6$ |
| 11 | $f_6$ | $f_{11}$ |

In the Table the frequencies $f_2$ to $f_{11}$ are chosen, for example, from a group of equidistant frequencies. Alternatively, it is conceivable that the difference between a number of these frequencies is greater than the difference between other combinations of these frequencies, to render channels having different transfer rates available to certain sub-stations.

From the Table it is also evident that the frequency of the distribution subcarrier intended for a specific sub-station is different for each sub-station from the frequency of the return subcarrier of that specific sub-station. This is advantageous in that it is impossible for a signal to be transmitted by a specific sub-station to disturb the reception of the distributed signal in the receiver of the relevant sub-station due to network reflection. The frequencies are also selected in such a way that a sub-station having a certain return subcarrier frequency is as far remote as possible from the sub-station arranged for receiving signals modulated on a subcarrier with this frequency. This is advantageous in that return signals reflected at an arbitrary location in the network cause the least possible interference at other sub-stations. For that matter, the larger the distance between the relevant sub-stations, the more the signals between these sub-stations will be attenuated, which leads to reduced interference.

Figure 1B:
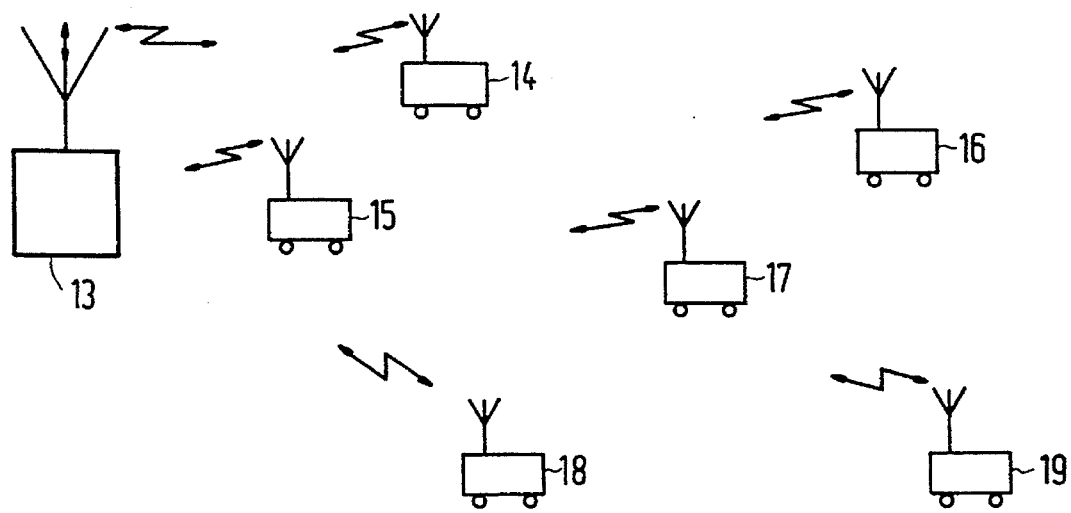
FIG. 1b shows a telecommunication network for mobile communication in which the invention can be implemented.

The telecommunication network shown in FIG. 1b comprises a main station 13 capable of exchanging information with a plurality of mobile sub-stations 14 to 19 over the channel which in this case is a radio link. In the telecommunication network shown in FIG. 1b it is advantageous to select the return subcarriers and the distribution subcarriers in overlapping frequency bands, so that less strict requirements need to be posed on the high-frequency properties of the components necessary in the network. The use of different frequencies for distribution subcarriers and return subcarriers is here also advantageous in that interference in a certain sub-station due to reflection of a signal transmitted by that sub-station is avoided.

Figure 2:
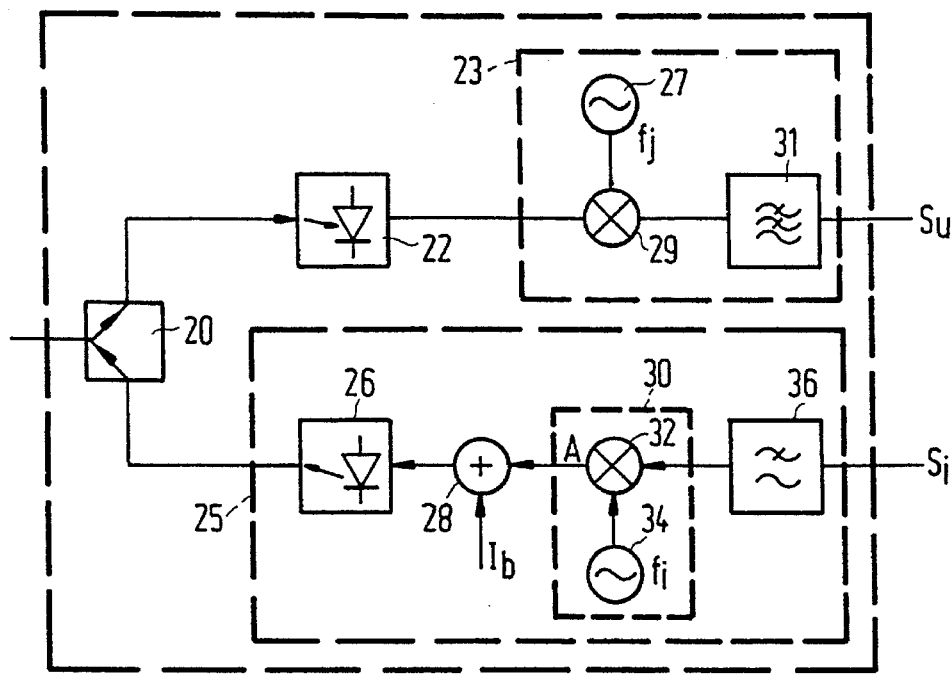
FIG. 2 shows a sub-station to be used in a telecommunication network according to the invention.

At the sub-station 2 shown in FIG. 2 the return signal $S_i$ is applied to a low-pass filter 36. Within a transmitter 25. The return signal $S_i$ is then applied to an input of an auxiliary modulator 30 via the low-pass filter 36. The auxiliary modulator comprises an oscillator 34 for generating the return subcarrier having a frequency $f_i$. The input of the auxiliary modulator 30 is connected to a first input of a multiplier circuit 32 and the output of the oscillator 34 is connected to a second input of the multiplier circuit 32. The output of the multiplier circuit 32, likewise forming the output of the auxiliary modulator 30, is connected to a first input of an adder circuit 28. A constant value $I_b$ is applied to a second input of the adder circuit 28. The output of the adder circuit 28 is connected to an input of the return modulator, in this case being an electro-optical converter 26. The output of the electro-optical converter 26, having a transmit signal for its output signal, is connected to a first input of an optical duplexer 20. An output of the optical duplexer 20 is connected to an optoelectrical converter 22. An output of the optoelectrical converter 22 is connected to an input of a receiver 23. In the receiver 23 the input signal of the receiver 23 is applied to a first input of a mixer stage 29. An output of an oscillator 27 carrying an output signal which has a frequency $f_j$ that differs according to the inventive idea from the frequency $f_i$, is connected to a second input of the mixer stage 29. An output of the mixer stage 29 is connected to an input of a low-pass filter 31 and the output signal $S_u$ of the receiver 23 is available on the output of the low-pass filter 31.

In the exemplary embodiment of the sub-station shown in FIG. 2 it is assumed that the signal $S_i$ comprises digital symbols whose binary values "0" and "1" respectively, are represented by voltages having the values 0 and +V. The output of the multiplier circuit 32 then carries a return signal formed by a return subcarrier having frequency $f_i$ modulated by an input signal $S_i$ filtered by the low-pass filter 36. The frequency of the subcarrier is generally different for different sub-stations. However, it is alternatively conceivable that a combination of TDMA (Time Division Multiple Access) and SCMA (SubCarrier Multiple Access) is used where different sub-stations transmit in different time slots in a frame, so that it is possible to select the same subcarrier frequency for a number of sub-stations. If the subcarrier is utilized ($S_i$= "1"), the adder circuit 28 adds a value $I_b$ to the modulated carrier to provide that the signal applied to the electro-optical converter 26 is always greater than zero. This is necessary, for example, if the electro-optical converter comprises a laser or a LED whose input signal is a current which is always to be positive. The electro-optical converter 26 produces an optical transmit signal which is fed to the channel via the duplexer 20. The electro-optical converter 26 here converts its input signal into intensity variations of the emitted light, but, alternatively, it is conceivable that the electro-optical converter converts its input signal into frequency or phase variations of the emitted light.

A signal received from the channel is applied to an optoelectrical converter 22 via the duplexer 20. By mixing the output signal of the optoelectrical converter 22 by the mixer stage 29, a baseband signal is obtained which comprises the distribution signal intended for the appropriate sub-station. In addition, the output signal of the mixer stage 29 further comprises carrier modulated distribution signals for the other stations. The low-pass filter 31 removes all the distribution signals intended for other sub-stations, so that only the desired distribution signal $S_u$ is left.

Figure 3:
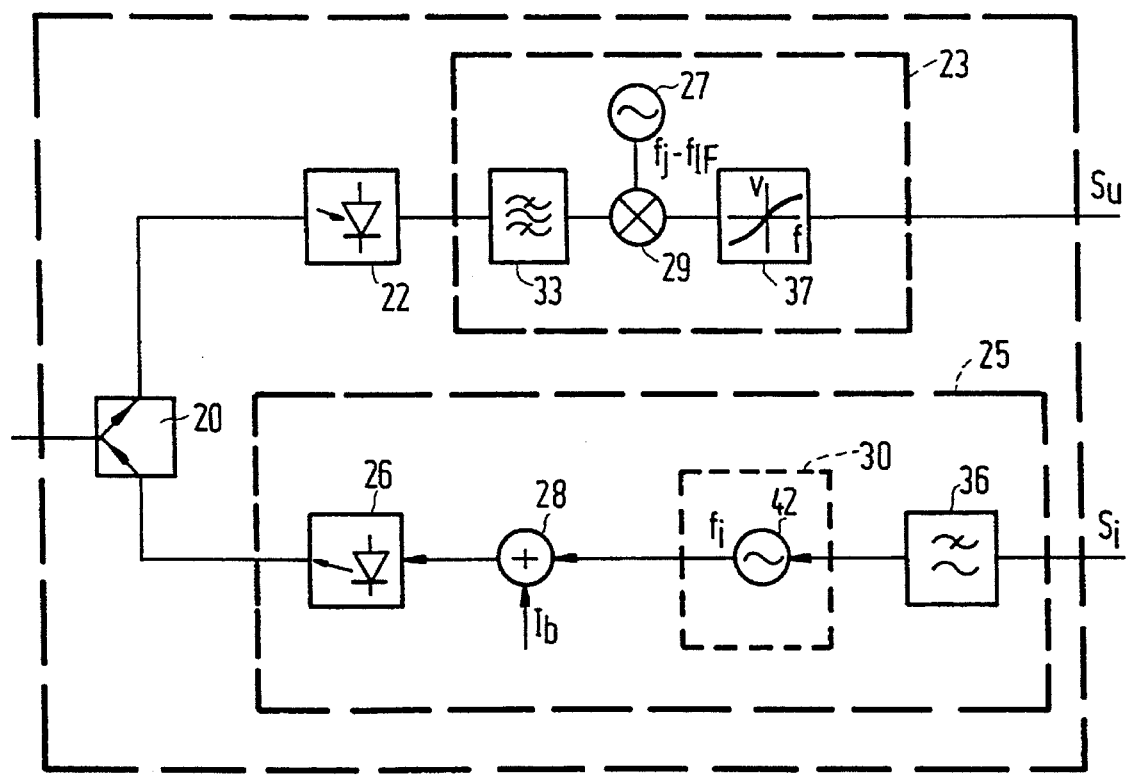
FIG. 3 shows an alternative embodiment for a sub-station to be used in a telecommunication network according to the invention.

At the sub-station 2 shown in FIG. 3 the return signal $S_i$ is applied to a low-pass filter 36 in a transmitter 25. The return signal $S_i$ is applied to an input of an auxiliary modulator 30. The auxiliary modulator 30 comprises an oscillator 42 for generating the subcarrier which has a mean frequency $f_i$, which oscillator can be frequency modulated by the auxiliary modulator input signal. For this purpose, the auxiliary modulator 30 comprises a frequency-controlled oscillator 42. The output of the auxiliary modulator 30 is connected to a first input of an adder circuit 28. A constant value $I_b$ is applied to a second input of the adder circuit 28. The output of the adder circuit 28 is connected to an input of a modulator which modulator is in this case an electro-optical converter 26. The output of the electro-optical converter 26, having a transmit signal for its output signal, is connected to a first input of an optical duplexer 20. An output of the optical duplexer 20 is connected to an optoelectrical converter 22 whose output is connected to the input of a receiver 23. In the receiver 23 its input signal is applied to a low-pass filter 33. The output of the low-pass filter 33 is connected to a first input of the mixer stage 29. An output of an oscillator 27 carrying an output signal that has a frequency $f_j$-$f_{IF}$, where $f_j$ differs according to the inventive idea from the frequency $f_i$, is connected to a second input of the mixer stage 29. The output of the mixer stage 29 is connected to a frequency discriminator 37. On the output of the frequency discriminator 37, which is also the output of the receiver 23, the distribution signal $S_u$ intended for the associated sub-station is available.

The auxiliary modulator 30 generates a frequency modulated subcarrier in response to the filtered input signal $S_i$. This is effected by applying the return signal $S_i$ to a frequency control input of a frequency-controlled oscillator 42. The filter 36 provides a limitation of the bandwidth of the signal $S_i$. At the input of the electro-optical converter 26 a signal is available which consists of the sum of the modulated subcarrier and a constant value $I_b$.

Via the optical duplexer 20 the signal received from the channel is applied to the optoelectrical converter 22 which converts its input signal into an electric signal. In this respect it is assumed that the distribution signal is modulated by frequency modulation on the associated distribution subcarrier. By mixing the filtered output signal of the optoelectrical converter 22 in the mixer stage 29 with a signal having the frequency $f_j$-$f_{IF}$, an intermediate frequency signal having a frequency $f_{IF}$ is obtained. This intermediate frequency signal is demodulated in the frequency detector 37, so that at the output of the receiver 23 the desired distribution signal is available.

Figure 4:
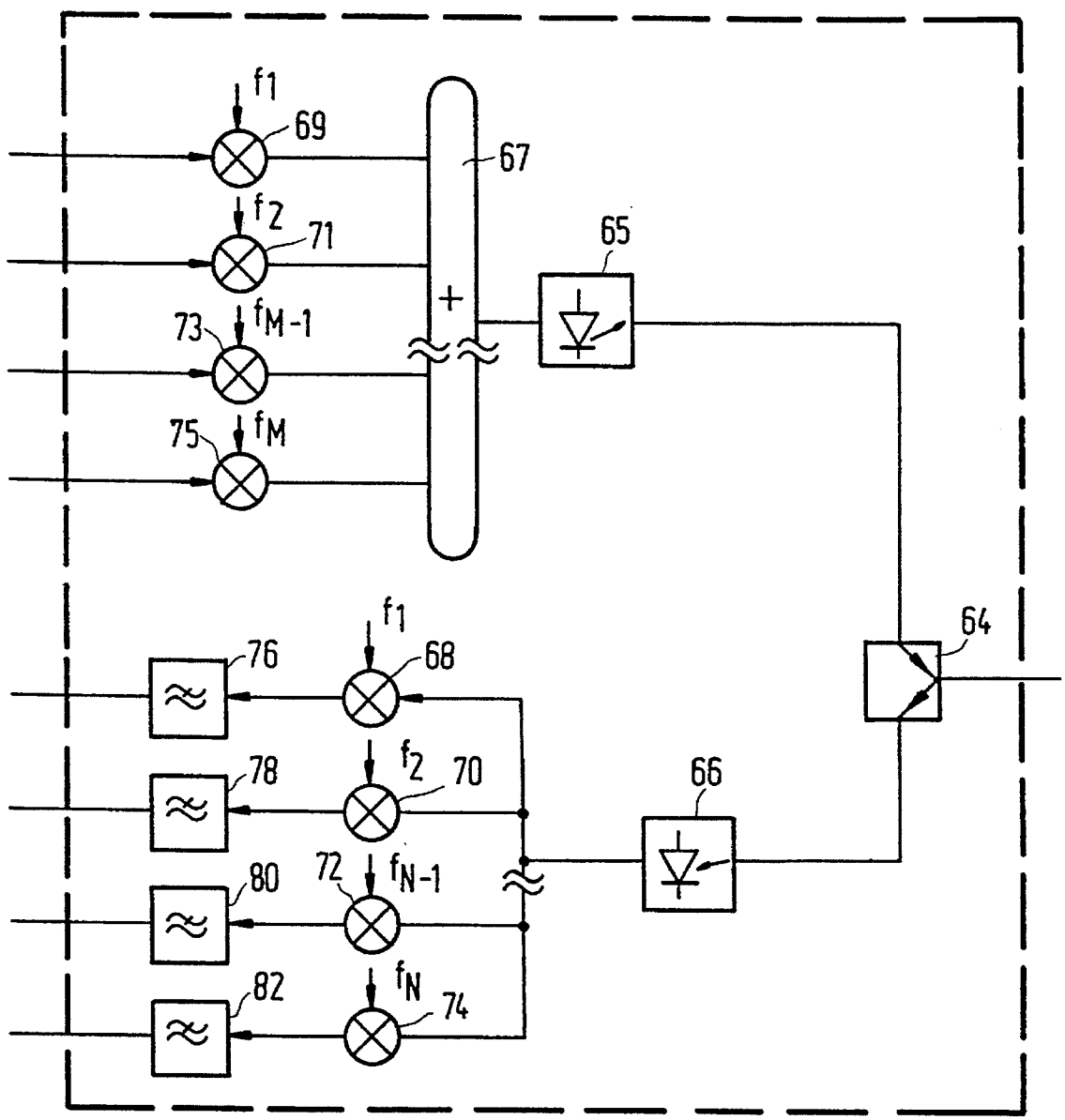
FIG. 4 shows a main station to be used in the telecommunication network according to the invention.

At the main station shown in FIG. 4 the various distribution signals are applied to a first input of its own amplitude modulators 69 . . . 75. A second input of the amplitude modulators is supplied with the distribution carriers having the frequencies $f_1$ to $f_M$. The outputs of the amplitude modulators 69 . . . 75 are connected to inputs of an adder circuit 67. The output of the adder circuit 67 is connected to the input of an electro-optical converter 65 whose output is connected to an input of an optical duplexer 64.

A combined input/output of the optical duplexer is coupled to the channel. An output of the optical duplexer 64 is connected to an optoelectrical converter whose output is coupled to a first input of a plurality of mixer stages 68, 70, 72 and 74. A second input of each mixer stage is supplied with a local oscillator signal having a frequency $f_i$ that differs for each mixer stage, with i=1 . . . N. The output of the mixer stage 68 is connected to an input of a low-pass filter 76; the output of the mixer stage 70 is connected to an input of a low-pass filter 78; the output of the mixer stage 72 is connected to the input of a low-pass filter 80 and the output of the mixer stage 74 is connected to the input of a low-pass filter 82.

The signals to be transmitted by the main station 1 to the sub-stations are modulated on their own distribution subcarriers by the modulators 69 . . . 75, and combined by the adder circuit 67 to a single auxiliary distribution signal. This auxiliary distribution signal is converted into an optical signal by the distribution modulator in this case being an electro-optical converter 65, which signal is fed to the channel through the optical duplexer 64.

The optical signal coming from the channel is converted into an auxiliary signal by an optoelectrical converter 66, which auxiliary signal comprises the signals of the sub-stations modulated on their own subcarrier frequencies. Since the frequencies of the subcarriers applied to the mixer stages 68 . . . 74 correspond to the frequencies of the subcarriers used by the various sub-stations, it is possible to use the subcarriers generated in the sub-station both for modulating the distribution signals and for demodulating the return subcarriers.

At the output of each mixer stage a demodulated signal coming from one specific sub-station is available. By removing all other frequency components lying above the maximum frequency of the data signals transmitted by the sub-stations by means of the low-pass filters 76 . . . 82, the output of each low-pass filter presents a signal that comes from one specific sub-station.

If the main station is to be suitable for frequency modulated signals, the amplitude modulators 69 . . . 75 are to be replaced by frequency modulators and frequency demodulators are to be included before the filters 76 . . . 82. Obviously, it is likewise conceivable that the distribution signals are frequency modulated on the distribution subcarrier and that the return signals are amplitude modulated on the return carriers, whereas also different combinations of modulation methods are conceivable.

What is claimed is:

1. A telecommunication system for transmitting distribution and return signals, comprising:

a main station;

a plurality of sub-stations, each of said plurality of sub-stations for transmitting to said main station a return signal modulated on a return carrier having a frequency in a predetermined return frequency band and for receiving from said main station a distribution signal modulated on a distribution carrier having a frequency in a distribution signal frequency band;

wherein said distribution frequency band and said return frequency band at least partially overlap and the distribution carrier and return carrier of each sub-station have different frequencies;

wherein said distribution carriers each have a frequency different from that of all other distribution carriers, and said return carriers each have a frequency different from that of all other return carriers; and, wherein at least said distribution carrier of a first sub-station and said return carrier of a second sub-station have the same frequency.

2. The telecommunication system of claim 1, wherein said main station and each sub-station include modulating means for modulating said distribution signals and said return signals, said modulating means including an electro-optical converter.

3. A main station for transmitting distribution signals to a plurality of sub-stations and for receiving return signals from said plurality of sub-stations, comprising:

modulating means for modulating said distribution signals on respective distribution sub-carriers corresponding to respective ones of said sub-stations, each distribution sub-carrier having a frequency in a distribution frequency band;

receiving means for receiving return signals from said sub-stations modulated on return sub-carriers corresponding to respective ones of said sub-stations, each return sub-carrier having a frequency in a return frequency band;

wherein said return frequency band and said distribution frequency band at least partially overlap; and, wherein the return sub-carrier and the distribution sub-carrier for each sub-station have different frequencies, and at least said distribution sub-carrier of a first sub-station and said return sub-carrier of a second sub-station have the same frequency.

4. The main station of claim 3, wherein said modulating means includes an electro-optical converter.

5. A sub-station for use in a telecommunication system including a main station and a plurality of other sub-stations, the sub-station for transmitting a return signal to a main station and for receiving a distribution signal from said main station, the sub-station comprising:

receiving means for receiving the distribution signal from said main station, said distribution signal modulated on a distribution carrier having a distribution frequency in a distribution frequency band; and modulating means for modulating a return signal on a return carrier having a return frequency in a return frequency band for transmission to said main station, said distribution frequency being different than said return frequency;

wherein said return frequency band and said distribution frequency band at least partially overlap; and, wherein a return carrier and a distribution carrier for each of the other sub-stations have different frequencies, and at least said distribution carrier of a first sub-station and said return carrier of a second sub-station have the same frequency.

6. The sub-station of claim 5, wherein said modulating means includes an electro-optical converter.

* * * * *